United States Patent [19]

Best et al.

[11] 4,046,360
[45] Sept. 6, 1977

[54] RUBBER FLAP DAMPER VALVES

[75] Inventors: Anthony Best, Westbury; Harold Harman, Bradford-on-Avon, both of England

[73] Assignee: Moulton Developments Limited, England

[21] Appl. No.: 703,944

[22] Filed: July 9, 1976

[30] Foreign Application Priority Data

July 11, 1975 United Kingdom ............... 29263/75

[51] Int. Cl.² ............................................. F16F 5/00
[52] U.S. Cl. .................................. 267/65 B; 188/298
[58] Field of Search ....................... 188/286, 298, 320; 267/65 B, 65 A, 65 R, 64 R, 64 A

[56] References Cited

U.S. PATENT DOCUMENTS 3,090,201  5/1963  May ....................................... 188/298
3,802,686  4/1974  Moulton ............................ 267/65 B Primary Examiner—James B. Marbert
Attorney, Agent, or Firm—Shoemaker and Mattare, Ltd.

[57] ABSTRACT

A rubber flap type damper valve, particularly intended for incorporation in a hydraulic suspension unit for a vehicle, the valve including rubber flaps which are precompressed resiliently against bump and rebound ports in a port plate, the invention being characterized in that each rubber flap covers one or more ports with each port so covered consisting of a hole of a diameter not exceeding 3 mm with the object of preventing the rubber flaps from becoming adhered to the port plate by sticking in the holes thereof. As a further measure of preventing adherence of the flaps to the port plate the undersurface of each flap may be corrugated, or otherwise rendered uneven. Respective different flaps may be precompressed against the port plate to different extents.

7 Claims, 5 Drawing Figures

RUBBER FLAP DAMPER VALVES

This invention relates to rubber flap type damper valves particularly for incorporation in vehicle wheel suspension units of the kind employing pressure fluid systems and in which the rubber flap type damper valves are employed for controlling fluid flow within the units.

Examples of rubber flap type damper valve means for controlling flow of hydraulic fluid in such suspension units are also known in the art. Typically, these comprise an apertured plate and deformable resilient flaps or discs of rubber on each side of the plate respectively adapted to obturate flow in one direction through the apertures or ports in the plate whilst flow in the opposite direction is permitted, with the rubber flaps or discs being resiliently deformed by bending.

However, when such rubber flaps, adapted to bend, are employed in high pressure systems, that is when the liquid pressures encountered are in excess of say, 6 atmospheres (90 lbs. per square inch), it has been found difficult to obtain consistent control of liquid flow. This is because the bending flaps respond to low differences in fluid pressure across them and do not reliably obturate the ports in conditions of fluctuating pressure where low flow velocities are encountered through the ports.

The present invention has for a particular object to provide an improved rubber flap type damper valve for use in controlling hydraulic flow in vehicle suspension units, in that the damper valve enables greater control to be had of the fluid flow and hence of the ride characteristics of the vehicle to which the suspension unit is fitted.

In British Patent Specification No. 1408862 there is described a rubber flap type damper valve for use in controlling liquid flow in a hydraulic suspension unit, each rubber flap of the valve being precompressed by rigid means into engagement with a ported wall to cover port means in the wall, the rigid means in conjunction with the wall bearing against and confining the major part of the external surface of the rubber flap so that when the flap deforms in response to liquid pressure, to at least partially uncover its associated port means, such deformation takes place primarily in compression. According to a further feature of the valve described in the aforementioned Specification No. 1408862 two rubber bodies are disposed at substantially 90° to one another, on opposite sides of the ported wall and the rubber bodies each constitute two flaps which are precompressed against the wall by two shaped metal members, one behind each resilient flap, the metal members being interconnected by spigot means passing through a central hole in the ported wall and through the metal members and the rubber bodies.

In valves of the type above referred to, one of the flaps is known as the "bump" flap and allows controlled flow only through one set of ports known as "bump" ports. The other flap is known as the "rebound" flap and this allows controlled flow only through a second set of ports known as "rebound" ports.

It is a usual requirement for the bump ports to have a much larger area than the rebound ports and it has in any case been common to employ bump and rebound ports which, individually, have sizes of 30 sq.mm. or more. Bump ports may have individual sizes exceeding 45 sq.mm.

In the known valves, the rubber flaps operate in a fluid medium at a pressure in excess of 90 lbs/sq.in. and are precompressed against individual ports having substantial area of 30 sq.mm. or more and it has been found in practical operation that on some occasions, a progressive but even reduction in volume of the displacer chamber has not been accompanied by a corresponding progressive and even rise in flow through the bump ports. On the contrary, the flow has been observed to be markedly uneven and has resulted in momentary build up of pressure in the displacer chamber which is contrary to that which occurs if the flow rate through the ports rises progressively and evenly. This unevenness of flow through the ports results in harshness in the operation of the suspension unit with a consequent deterioration in the ride afforded by the vehicle suspension system in which it is incorporated.

According to the invention there is provided rubber flap damper valve means for controlling liquid flow between displacer and spring chambers through ports in a wall separating the chambers, said damper valve means comprising a first or "bump" rubber flap, which is located in the spring chamber and covers a first or "bump" set of ports to prevent flow from the spring chamber to the displacer chamber, while being resiliently deformable to permit flow in the opposite direction, and said damper valve means further comprising a second or "rebound" rubber flap which is located in the displacer chamber and covers a second or "rebound" set of ports to prevent flow from the displacer chamber to the spring chamber while being resiliently deformable to permit flow in the opposite direction, with both the rubber flaps being precompressed by being sandwiched between profiled rigid plates and said separating wall, said plates and said wall bearing against the respective rubber flaps so that they are yet further compressed when resiliently deforming to permit flow through the ports which they cover, the invention being characterised in that the rebound ports and/or the bump ports are respectively constituted by sets of apertures or holes each having a diameter not exceeding 3mm.

The bump ports (and preferably the rebound ports also), are thus very much smaller than the corresponding ports of the previously known damper valves of analogous type. Practical tests have shown marked improvement in operation in that the measured flow through a multitude of small ports has been found to rise progressively and evenly.

This has led to the suspicion that the inferior characteristics of the previously known damper valves may have been due to the flaps having become momentarily stuck in the relatively large ports away from which they were intended to deflect in order to permit flow. It is thought that the rubber material of the flaps deformed into the port and become momentarily adhered to the walls of the port. The tendency of the flaps to fail to operate as intended in conjunction with large ports was particularly noticable when, either the flaps were subjected to a high degree of precompression against the ports, and/or the hydraulic pressures under which the flaps operated was high, i.e. considerably in excess of 200 lbs/sq. in.

The reduction in the port size, which is now proposed according to the invention, makes a major contribution to curing this defect. However, a further contribution can be achieved by rendering the surface of each rubber flap which abuts with the port plate around the port apertures, of dimpled corrugated or other shape whereby the surface is uneven and has a multitude of contact points with the plate. This causes some lamination of the flow past the contact surfaces of the flaps and reduces the liability of the flaps to vibrate.

A yet further improvement in the operational performance of a damper valve according to the invention can be achieved if the precompression which is applied to various regions of each flap is deliberately rendered uneven.

It will be recalled that the bump and rebound flaps each consist of a body of rubber precompressed against the port plate and a shaped metal member one behind each flap, and that a spigot passes through the metal members, the two flaps and the port plate to unite the assembly. Thus in fact the centre of each flap is fixed or anchored by the spigot, while the flap may be considered as having a pair of deformable lips, one on each side of its anchored and hence non-deformable central region. The aforementioned unevenness of precompression can hence consist of applying a different degree of precompression to the two deformable lips of each flap. One lip will then deform before the other when both are subjected to rising fluid pressure. This differential precompression is achieved by appropriate contouring of the shaped metal members bearing against each flap. This differential precompression may be applied to the lips of the bump flap, the rebound flap or both, and contributes to progressive and even flow rates being achieved past the valve in one or both directions to or from the spring chamber.

By the term "rubber" in this specification, we mean natural rubber or rubber-like elastomeric materials.

In the accompanying drawings:

FIG. 2 shows in diagrammatic plan view, a port plate with 12 bump ports and four rebound ports, each port having a diameter not exceeding 3mm; while

Figure 1:
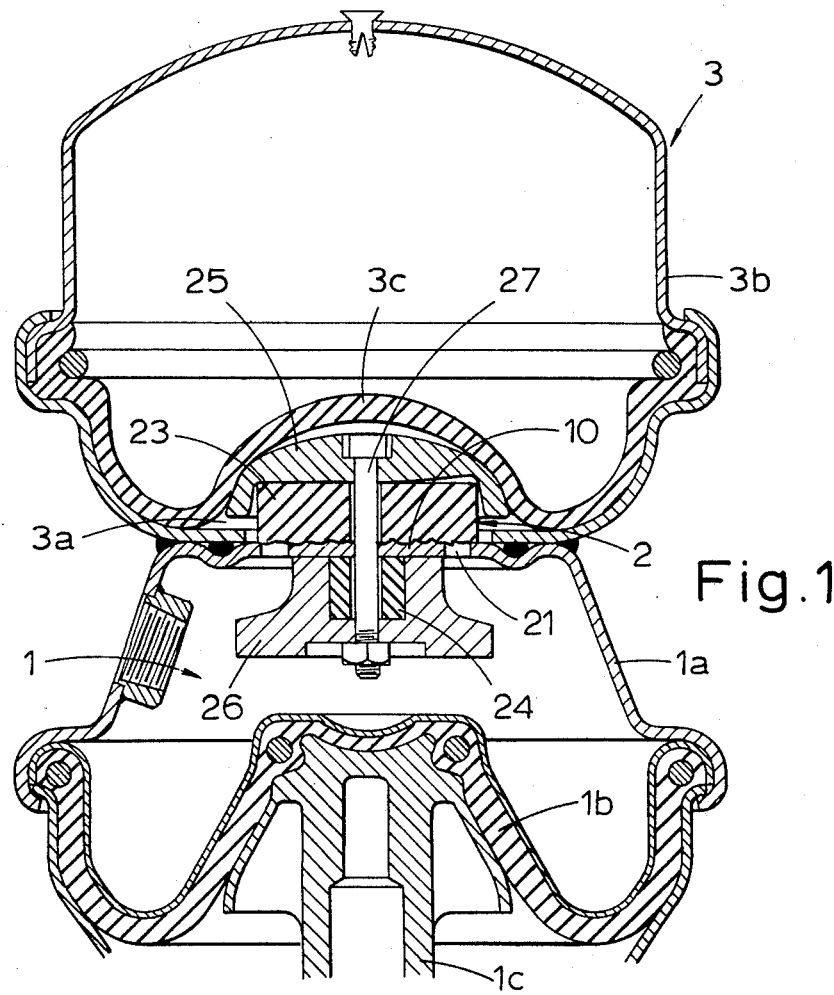
FIG. 1 shows a transverse cross section of a suspension unit equipped with a damper valve for controlling flow between the displacer and spring chamber of the unit.

Referring first to FIG. 1, there is here shown in transverse cross section a suspension unit which is intended to be equipped with a damper valve according to the invention.

The suspension unit is of a well known type which includes a displacer chamber 1 which is filled with liquid and which is in liquid flow intercommunication by way of a damper valve assembly, generally designated 2, with a liquid filled chamber 3a of a hydropneumatic accumulator spring, generally designated 3.

The hydropneumatic accumulator spring, generally designated 3, consists of a rigid metal casing 3b defining an interior space which is separated into two parts by means of a separating diaphragm 3c. The space above the diaphragm 3c is filled with a gas at a pressure of, say, 200 p.s.i., and the separating diaphragm separates this gas from the liquid occupying the remainder of the space within the rigid casing 3b.

The hydraulic displacer chamber 1 is bounded in part by a rigid casing 1a and in part by a flexible diaphragm 1b. The diaphragm is acted upon by a piston 1c. As the piston 1c rises (as viewed in the drawing), liquid is displaced from the displacer chamber 1 through bump ports 21 in the damper valve assembly, generally designated 2, and into the liquid-filled part of the spring 3. Upon downward movement of the piston relative to the displacer chamber 1, liquid is displaced from the liquid-filled part of the springe 3 and through rebound ports of this valve, which rebound ports do not appear in FIG. 1, back into the displacer chamber 1.

Figure 2:
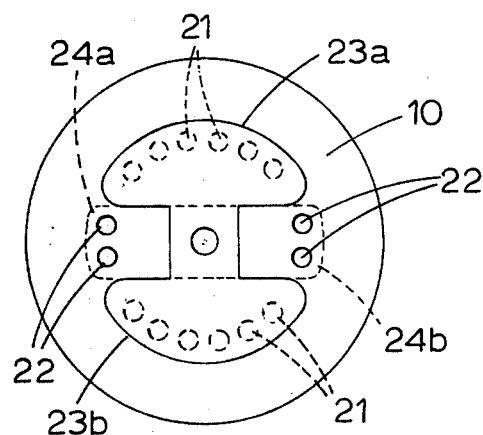

Referring now to FIG. 2, and also to FIG. 1, the damper valve assembly generally designated 2, consists of a pair of rubber or rubber-like bodies mounted one on each side of a port plate, generally designated 10. In the embodiment shown in FIG. 1, the port plate 10 forms a central part of the rigid housing 1a bounding in part the displacer chamber 1.

The port plate 10 is shown in FIG. 2 and in this plate are formed the bump ports 21 which, in the embodiment shown, are constituted by twelve small holes, each hole having a diameter not exceeding 3 millimeters. Also formed in the port plate 10 are rebound ports 22 which, in the embodiment shown in FIG. 2, are constituted by four small holes, each of a diameter not exceeding 3 millimeters.

The rubber body indicated by reference 23 in FIG. 1 is located above the port plate 10 and constitutes two flaps 23a and 23b (FIG. 2) which each cover six bump ports 21.

The rubber body indicated by 24 in FIG. 1 is located beneath the port plate 10 and constitutes two flaps 24a and 24b each of which cover two rebound ports 22. The rubber body 23 is backed by a specially shaped housing member 25 and the rubber body 24 is also backed by a specially shaped housing member 26.

The housing members 25 and 26 have legs which embrace the respective rubber bodies 23 and 24 and which legs abut against the port plate 10. A spigot 27 secures the housing members 25 and 26 to the port plate, the length of the legs of the respective housings 25 and 26 in abutment with the port plate when the spigot 27 secures the two housing members governs the degree of maximum precompression which can be applied to the two rubber bodies 23 and 24 to urge them resiliently against the port plate 10 to cover the bump and rebound ports 21 and 22 respectively.

Figure 3:
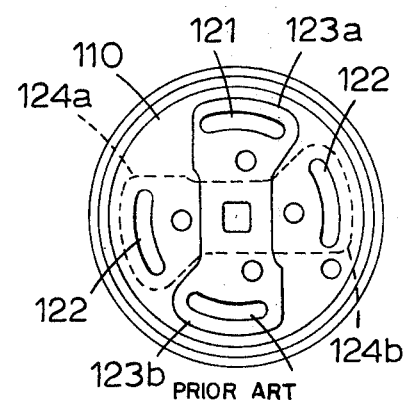
FIG. 3 is a similar view of a port plate with but two bump and two rebound ports.

We will refer now to FIG. 3 which shows in a view similar to that of FIG. 2 a port plate of a known damper valve assembly. This includes a port plate 110 with two bump ports 121 and two rebound ports 122. The bump ports are covered by a rubber body constituting two bump flaps 123a and 123b. A rubber body constituting two flaps 124a and 124b covers the rebound ports 121.

In the prior known arrangement shown in FIG. 3, the bump ports 121 and the rebound ports 122 are respectively constituted by holes in the port plate 110, which holes may have sizes of 30 square millimeters or more. In the case of the bump ports 121, the holes may have an individual size exceeding 45 square millimeters.

When liquid is displaced from the displacer chamber 1 the liquid flows through the bump ports 21 (or 121 in FIG. 3) with the bump flaps 23a and 23b (or 123a and 123b in FIG. 3) being deformed largely in compression.

When liquid is returned to the displacer chamber 1 from the liquid-filled part of the spring 3, the liquid flows through the rebound ports 22 (or 122 in the case of FIG. 3), with the rebound flaps 24a and 24b (or 124a and 124b in FIG. 3) being deformed in compression.

Figure 4:
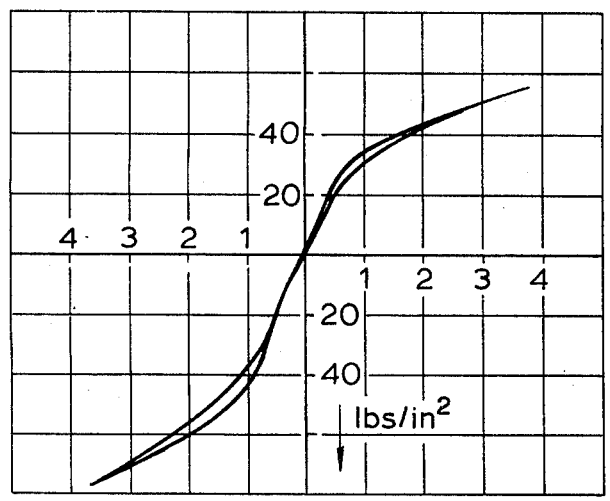
FIGS. 4 and 5 are graphs showing the pressure flow characteristics of the valve port arrangements of FIGS. 2 and 3 respectively.
Figure 5:
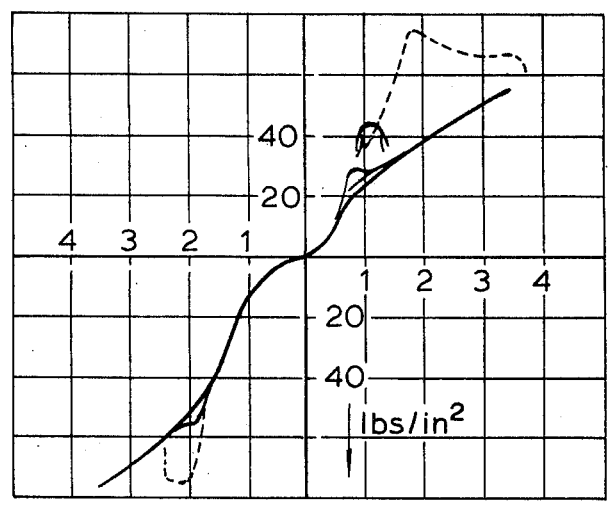

Reference will now be made to FIGS. 4 and 5 which are graphs showing the pressure/flow characteristics of the valve port arrangements shown in FIGS. 2 and 3 respectively.

Liquid flow is represented longitudinally, while liquid pressures are represented vertically in the graphs. The right of the graph represents flow in bump, that is flow through the ports 21 (or 121 in FIG. 3), while the left of the graph represents flow in rebound through the ports 22 (or 122 in FIG. 3).

Referring to FIG. 5, the flow indicated in full lines is that rate of flow which is required. However, it has been found that in the case of a valve arrangement of the kind shown in FIG. 3, on many occasions the flow characteristics in fact occurring are those shown in dotted lines in FIG. 5.

Thus in bump there is a sharp increase in hydraulic pressures which is not accompanied by the required rapidly increasing rate of flow. A similar characteristic has been observed in the rebound mode.

As indicated in FIG. 4, the rate of flow rises more evenly to accompany rise in pressure, both in the bump and rebound modes, this being achieved by the valve and port arrangement depicted in FIG. 2 where each of the holes constituting the bump and rebound ports are small and do not exceed 3 millimeters in diameter.

In explanation of the above it is thought that the high degree of precompression which is applied to the two rubber bodies 123 and 124, constituting the rebound and bump flaps, as well as the high liquid pressures which obtain in the suspension unit, cause the rubber flaps to adhere in the holes constituting the bump and rebound ports in the prior known arrangement of a valve port as depicted in FIG. 3. A significant improvement in the performance in the valve has been found to exist when the valve ports are constituted as depicted in FIG. 2.

A further contribution to the improved operation of the valve can be achieved by rendering the surfaces of each rubber flap 23a, 23b, 24a and 24b, which abut with the port plate 10 around the ports 21 and 22, of dimpled, corrugated, or other shape, whereby the surfaces of the rubber is uneven and so that it has a multitude of contact points with the plate. This causes some lamination of the flow past the contact surfaces of the flaps and reduces the liability of the flaps to vibrate.

A yet further improvement in the operational performance of the damper valve according to the invention can be achieved if the precompression which is applied to the valve regions of each flap is proportionately rendered uneven.

Thus, as depicted in FIG. 1, the housing member 25 bearing against and precompressing the rubber body 23 is given an internal contour such that one of the bump flaps is precompressed to a greater degree than is the other bump flap.

Similar differentiated precompression can be applied to the rebound flaps. This differentiated precompression contributes the even flow rates being achieved past the valve in one or both directions of liquid flow to or from the displacer chamber.

We claim:

1. A flap type damper valve for use in controlling liquid flow in a hydraulic suspension unit, comprising: an apertured port plate having a plurality of bump ports and a plurality of rebound ports therethrough, each of said ports having a predetermined maximum diameter; a pair of elastomeric flap valves secured on opposite sides of the port plate with one of the flap valves disposed in overlying relation to the bump ports and the other of said flap valves disposed in overlying relation to the rebound ports, to thereby obturate flow in one direction through the respective ports and to enable flow in the opposite direction through the respective ports, the predetermined maximum diameter of the ports being such that the flap valves are not extruded into the ports at the pressures encountered; rigid flap valve retaining means engaged with a part of the external surface of each flap valve and precompressing each flap valve into engagement with the port plate to cover the respective, associated ports in the plate, the rigid retaining means in conjunction with the port plate engaging and confining a major part of the external surface of the flap valves so that when the flap valves deform in response to liquid pressure to at least partially uncover their associated ports, such deformation takes place primarily in compression; and the port plate contacting surface of said flap valves being irregularly shaped to provide a multiplicity of contact points with the plate, whereby some lamination of flow past the contact surfaces of the flap valves with the plate is obtained, thus reducing the tendency of the flap valves to vibrate during operation.

2. A flap type damper valve as in claim 1, wherein each flap valve has two flaps and each flap covers a plurality of ports, the total areas of the bump ports and rebound ports, respectively, being in the ratios of between 3:1 and 14:1.

3. A flap type damper valve as in claim 1, wherein each flap valve comprises a single, unitary body secured to the port plate to provide two flaps, said flap valve retaining means being unevenly contoured to place one of the flaps of the flap valves under different precompression than the other flap.

4. A flap type damper valve for use in controlling liquid flow in a hydraulic suspension unit, comprising: an apertured port plate having a plurality of bump ports and a plurality of rebound ports therethrough, each of said ports having a predetermined maximum diameter; a pair of elastomeric flap valves secured on opposite sides of the port plate with one of the flap valves disposed in overlying relation to the bump ports and the other of said flap valves disposed in overlying relation with the rebound ports, to thereby obturate flow in one direction through the respective ports and to enable flow in the opposite direction through the respective ports, the predetermined maximum diameter of the ports being such that the flap valves are not extruded into the ports at the pressures encountered; rigid flap valve retaining means engaged with a part of the external surface of each flap valve and precompressing each flap valve into engagement with the port plate to cover the respective, associated ports in the plate, the rigid retaining means in conjunction with the port plate engaging and confining a major part of the external surface of the flap valves so that when the flap valves deform in response to liquid pressure to at least partially uncover their associated ports, such deformation takes place primarily in compression; and the area of contact between at least one of the rigid flap valve retaining means and the associated flap valve being unevenly contoured to place portions of the respective flap valves under different amounts of precompression, to obtain even flow rates through the damper valve.

5. A flap type damper valve as in claim 4, wherein the surface of each flap valve which is urged toward the port plate is uneven to provide a multitude of contact points between the flap valve and port plate.

6. A flap type damper valve as in claim 4, wherein each flap valve has two flaps and each flap covers a plurality of ports, the total areas of the bump ports and rebound ports, respectively, being in the ratios of between 3:1 and 14:1.

7. A flap type damper valve as in claim 4, wherein the rigid retaining means is unevenly contoured.

* * * * *